F. S. SMITH.
PROCESS OF DESTROYING INSECT LIFE.
APPLICATION FILED APR. 30, 1918. RENEWED OCT. 21, 1919.

1,352,699.

Patented Sept. 14, 1920.
2 SHEETS—SHEET 1.

INVENTOR
Franklin S. Smith
By
Cyrus N. Anderson
ATTORNEY

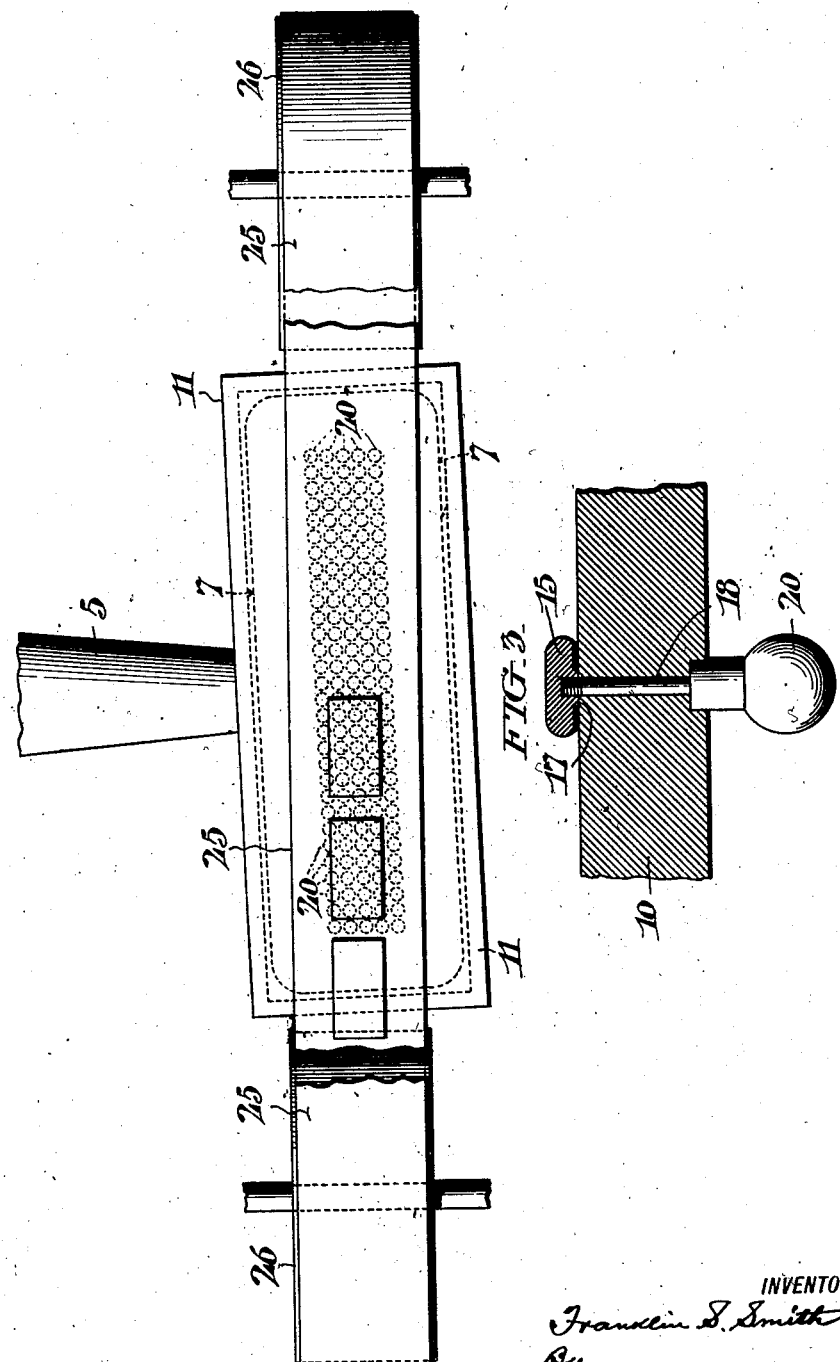

UNITED STATES PATENT OFFICE.

FRANKLIN S. SMITH, OF PHILADELPHIA, PENNSYLVANIA.

PROCESS OF DESTROYING INSECT LIFE.

1,352,699.  Specification of Letters Patent.  Patented Sept. 14, 1920.

Application filed April 30, 1918, Serial No. 231,666. Renewed October 21, 1919. Serial No. 332,318.

*To all whom it may concern:*

Be it known that I, FRANKLIN S. SMITH, a citizen of the United States, residing in the city of Philadelphia, State of Pennsylvania, have invented a certain new and useful Process of Destroying Insect Life, of which the following is a specification.

My invention relates to the art of destroying insect life in infested food and other products without injury to the product treated. By the words "insect life" employed herein, I intend to include not only the insect or imago itself, but also the egg, larva and pupa.

Without attempting to enumerate all of the products which may be treated according to my invention, I may mention grains, beans, milled cereals, dried fruits, etc.; also furs, woolens, etc. It is to be understood, however, that the employment or use of my invention is not limited or confined to the treatment of the products designated above, but may be employed or used for the treatment of many other products for the destruction of insect life which may infest the same.

In order to be practically and commercially successful, it is necessary that an art or method designed for the treatment of products as indicated above and for the purpose stated, shall not only be capable of being used for the treatment of products when they are not inclosed in receptacles such as the usual commercial pasteboard cartons but also when they are so inclosed. I have found by actual, practical experience that my invention is admirably suited for the treatment of products both when inclosed and when uninclosed in receptacles. I have ascertained by actual experience and practice that the process embodying my invention may be employed in the treatment of food products such as cereals, milled or unmilled, in pasteboard cartons, without any injury whatever to such cartons. It is necessary, in the treatment of products in cartons, that the pasteboard of which the latter are constructed shall not be punctured by the electrical discharge caused to pass through the package. It is one of the novel features of my invention that products contained in pasteboard cartons may be subjected to treatment and all of the insect life which may be present therein destroyed without, in the slightest, injuring the carton by puncturing or otherwise.

My invention may be said to consist broadly in the subjection of the product infested with insect life to the action of electrical disruptive conduction, of a current density sufficient to destroy such insect life as may be present in the article or product treated, and of properly controlled voltage gradients.

The treatment should be practically homogeneous; that is, every part of the product or article treated should be subjected as far as is practicably possible to a like action of the current.

As has already been indicated, the voltage gradients must be less than the rupturing gradients of the products or articles being treated or the container for the same, in case such product or article should be inclosed within a container; also the current density must be less than that which would cause damage to the product or article by carbonization, dehydration, etc.

The objects of my invention generally may be stated to be to provide a process for the treatment of products and articles infested with insect life by means of electrical disruptive conduction and to so control and regulate the density of the current as to prevent carbonization, dehydration, etc., of the product or article being treated, also to so control and regulate the voltage gradients as to limit the same to values less than the rupturing gradients of the product or article being treated or the container for the same, if it be inclosed within a container.

The process invented by me is not dependent upon any particular form of apparatus for its commercial and practical utilization, although apparatus of some kind is essential to its utilization and in the accompanying drawings I have illustrated schematically a novel and very efficient construction of apparatus which I propose to employ for the treatment of products and articles for the purposes hereinbefore set forth and indicated.

In the drawings accompanying this application:

Fig. 2 is a top plan view of a portion of the apparatus shown in Fig. 1; and

Fig. 3 is a sectional view showing a detail of construction.

Figure 1:
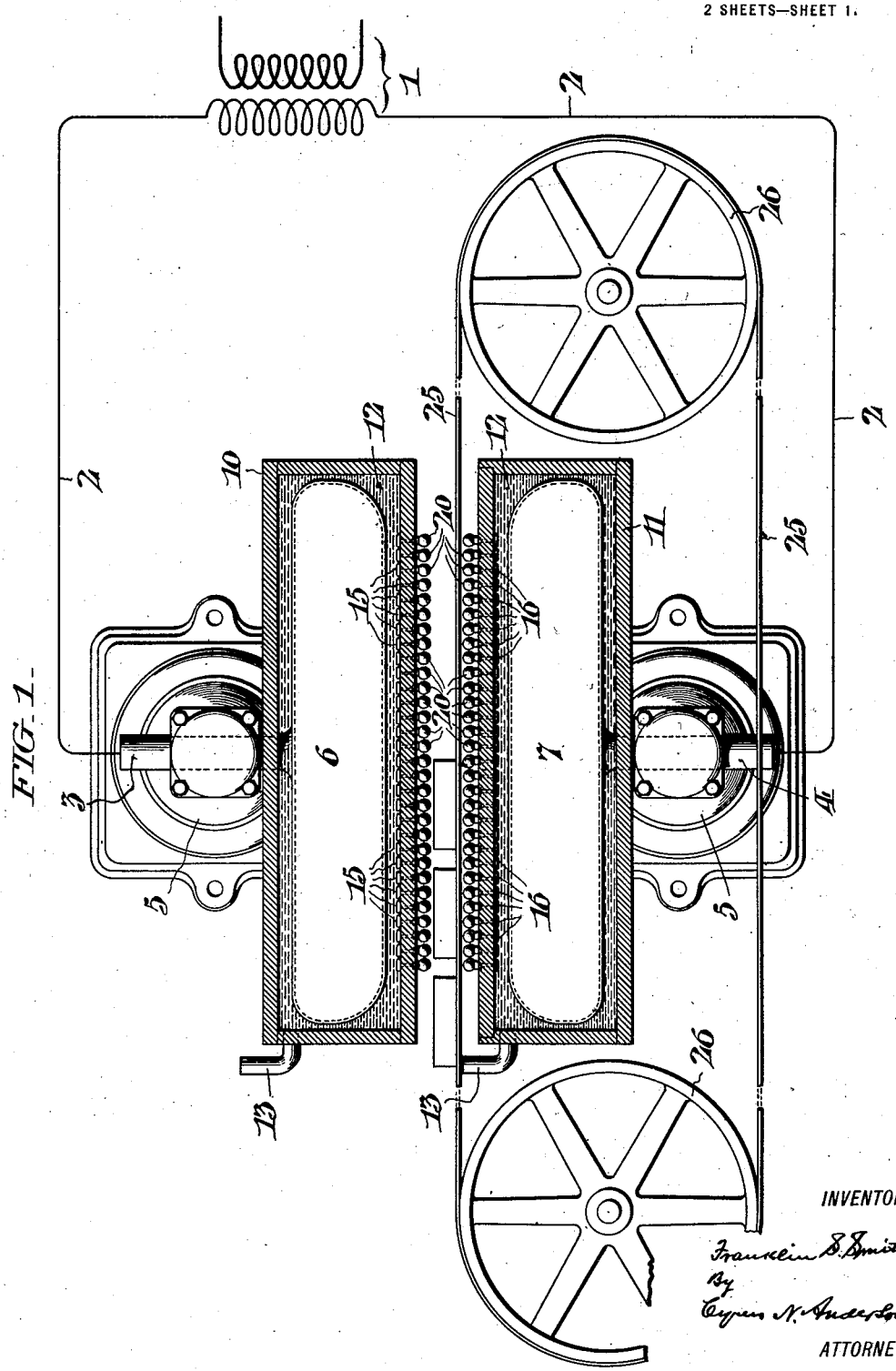
Figure 1 is a view showing an apparatus adapted for the practising of my process partly in section and partly in elevation.

Referring to the drawings; 1 designates a transformer the secondary of which is connected by means of conductors 2 to the shanks or stems 3 and 4 which are supported upon high tension insulators, a portion of one of which is shown in plan at 5 in Fig. 2. The shanks 3 and 4 respectively are connected with and support common condenser plates 6 and 7. These plates, in the construction shown, are in the form of hollow bodies having wide flat surfaces in opposed relation with respect to each other. These plates are rounded at their outer edges so as to prevent too great a flux concentration at such edges. These condenser plates are respectively situated in receptacles or containers 10 and 11, consisting of dielectric material, such, for instance, as bakelized fiber. These containers contain and are filled preferably with a liquid dielectric 12 such as transformer oil, paraffin oil, etc. The liquid dielectric is introduced into the containers 10 and 11 through pipes 13 which may be closed by stoppers or in any other suitable way. It is obvious that a solid dielectric could be used, preferably a wax, such as ceresin. Coöperating with the respective condenser plates 6 and 7 are a plurality of small condenser plates 15 and 16. These condenser plates are situated within and are supported upon the opposing adjacent sides of the containers or receptacles 10 and 11. In order to prevent possible leakage between the small condenser plates of the respective groups thereof, the said plates are each provided with a small central projection as indicated at 17 in Fig. 3, which supports the greater portions of the underneath surfaces of the said plates in spaced relation to the portions of the containers 10 and 11 upon which they are supported.

The liquid 12 within the containers 10 and 11 occupies the spaces between the condenser plates 6 and 7 and the respective groups of small condenser plates 15 and 16 and constitutes the dielectric between the said condenser plates 6 and 7 and the respective groups of small condenser plates 15 and 16 and between the small condenser plates themselves.

Each of the small condenser plates 15 and 16 is connected by means of a shank or rod 18, which extends through the adjacent opposing sides of the containers 10 and 11, with a spark gap electrode 20, the said electrodes being situated in opposing relation with respect to each other as is shown in Fig. 1 of the drawings.

In the apparatus as designed and illustrated by me, it will be noted that I have provided two sets of condensers or capacities, each set comprising or including a plurality of condenser plates in multiple which are connected each to a side of the secondary of the transformer 1 and also that the two sets of condensers or capacities are connected in series by means of the spark gap formed by the opposing electrodes 20 having connection respectively with the plurality of small condenser plates as hereinbefore described. It will be obvious to those skilled in the art that the desired result may be obtained by the employment of only one set of condensers or capacities. The means in the circuit which provides electric capacity distributes the potential drop and limits the current density so that the latter may be controlled and maintained at values below the voltage gradients of the materials or objects being treated.

In order to convey the products or articles to be treated through the space between the opposing electrodes, I have provided means consisting of a conveyer belt 25 of dielectric material, supported upon revolving drums or pulleys 26 of well known form and construction, driven in any suitable manner from any suitable source of power, not shown. That other means of causing the product to pass between the electrodes may be employed such as gravity feed, etc., is obvious.

Upon reference to Fig. 2 of the drawings in which the top spanning portion of the belt is shown and in which the lower container 11 and the lower group of electrodes 20 carried thereby are shown in top plan view, it will be observed that the arrangement is such that the conveyer belt extends diagonally over or angularly with respect to the group of electrodes 20. One purpose of this arrangement is to cause the products or articles being treated to travel diagonally across the rectangular shaped group of electrodes so that every particle of and point within the product or article will be subjected to the current discharged across the space between the electrodes 20,—thereby obtaining and insuring an approximately or substantially homogeneous treatment of the product or article as it travels between the electrodes.

In the apparatus as illustrated there are five rows of electrodes and thirty electrodes in each row. Let us assume that these electrodes are one and one-half inches apart in each horizontal direction and that the apparatus is connected with an alternating supply current of sixty cycles. Such a current will produce or cause one hundred and twenty group discharges per second across the spark gap between the electrodes 20.

The conveyer belt 25 as has been already stated conveys the products or articles to be treated at an angle to or diagonally with respect to the rows of electrodes as is shown in Fig. 2. The number of electrodes between which each inch transversely of the product or article being treated passes may be ascertained by dividing the number (30) of electrodes in each row by the distance, 1½ inches, between the electrodes, which, under the assumption, will give 20 as the number of electrodes between which each transverse inch of the product or article will pass; which, in operation, amounts to twenty group discharges per transverse inch through the product or article. To ascertain the speed at which the belt shall travel in order to secure the number of discharges desired through the product or article being treated (400 per square inch), the number, 120, of group discharges should be divided by the number (20) of discharges per transverse inch of the product or article being treated, which gives 6, the latter being the number of inches per second traveled by the product or article under the conditions stated.

It is not necessary that the speed of travel of the belt and consequently of the products and articles carried thereby to be treated shall be mathematically correct or in exact accordance with the figures as above indicated, but preferably in practice the travel of the belt should be somewhat slower than it is indicated mathematically.

The distance apart of the discharges through the product or article being treated, or in other words the number of the discharges required through any unit of area of the products or articles being treated varies with the material. In general, the distance apart of the discharges through various products varies from one-fiftieth to one-tenth of an inch.

To insure homogeneous treatment and for obvious reasons of efficiency, the spark gap should be as short as is practicable, that is, just sufficient clearance to permit of the passage of the conveyer belt 25 and the product carried thereby between the opposing electrodes 20.

The electrodes 20 preferably should consist of spheres and their radii should be about one-third of the spark gap length.

After considerable use the electrode material disintegrates leaving the surface rough. Obviously the larger the sphere the less the roughness will alter the spark gradient at the surface of the electrodes.

The electrodes of each group, that is, electrodes of the same side, positive or negative, should be separated from each other a distance equal to about one-third of the length of the spark gap in order to avoid discharges between the same.

The condensers preferably should be of such capacity that about 15 watts per inch of spark gap length is expended for milled cereals and about 40 watts for certain cereals, as for example rice. The larger the particles of the product being treated the greater amount of energy is required to effect efficient treatment.

The voltage gradient across the spark gap should be a few kilo-volts in excess of the actual voltage required to break down, or rupture, the air.

Obviously the condenser dielectric strength must be high enough to prevent corona or rupture, otherwise the treated product will be damaged.

In designing apparatus for use in the practising of my invention the designer must have in mind the product to be treated and must provide condenser dielectrics of such dimensions and of such dielectric constant that the product or its container, if there be a container, is not overstressed.

In designing apparatus for carrying out my process it must be kept in mind that generally in the treatment of cereals in pasteboard boxes or cartons the amount of energy which may be employed in unit discharge is limited by the box or carton. There are, however, certain exceptions, for example rolled oats. In granular cereals the discharge tends to take a path around the granules whereas in the case of certain other products, for example, rolled oats, the discharge tends to puncture the same.

In general the smaller the particles being treated the less the energy which may be employed in unit discharge. For example, buckwheat flour would be carbonized by a discharge which would not harm corn meal; and the latter would be carbonized by a discharge which would not harm rice.

The operation of my invention may be described as follows: The voltage of the secondary coil of the transformer 1 is applied across the apparatus, that is, through the sets of condensers or capacities as hereinbefore described. When the voltage reaches the disruptive value the air in the spark gap between the electrodes 20 breaks down so that current exists. Upon the breaking down of the air, it becomes conducting so that most of the applied voltage is placed on the dielectrics of the condensers with a proportional part on the conveyer belt and on the pasteboard carton, assuming that the product or article being treated is inclosed within such carton. The apparatus as designed and as above described is so constructed and operated that the voltage gradient across the condenser dielectrics is below their rupturing value, so that they do not break down, in consequence of which neither does the carton or belt because the voltage gradients across them are below their rupturing gradients.

When an alternating current is used, the voltage varies from zero to its highest point and the reverse and the operation of the apparatus and the process is the same for the successive alternations of the current.

It will be understood that high tension unidirectional or oscillating current also may be employed in the practising or carrying out of my invention and that I am not limited to the use of an alternating current such as is hereinbefore described.

I claim:

1. The process of treating products for the purpose of destroying insect life which consists in the subjection of the products to the action of disruptive conduction of current density limited to a value below that which would damage the products and in which the voltage gradients across the products are less than the rupturing gradients of the products.

2. The process of treating products within containers for the purpose of destroying insect life, which consists in the subjection of the products within such containers to the action of disruptive conduction of current density limited to a value below that which would damage the products or containers and in which the voltage gradients across the products and containers are less than the rupturing gradients of the products and containers being treated.

3. The process of treating products and articles within containers infested with insect life to destroy the latter, which consists in subjecting the said products or articles to the action of electrical disruptive conduction of a current density sufficient to destroy the same, and in which the available electrical energy across the products or articles within containers is limited to values less than those which would cause damage to the products or articles or their containers.

4. The process of treating products for the purpose of destroying insect life, which consists in the subjection of the same to the action of disruptive conduction of current density limited to a value below that which would damage the said products, and in which the voltage gradients across the products are less than the rupturing gradients of the products being treated, and moving the said products across the line along which the said disruptive conduction takes place.

5. The process of treating products electrically, which consists in creating an electrical discharge across a gap, interposing electrical capacity in series with said gap to distribute the potential drop and limit the current density below the voltage gradients of the material to be treated, and subjecting the products to be treated to said discharge.

6. The process of treating products contained in cartons for the purpose of destroying insect life therein, which consists in creating an electrical discharge across a gap, interposing electrical capacity in series with said gap to distribute the potential drop and limit the current density to a value below the voltage gradients of the material of which the cartons are composed, and subjecting the cartons and the material therein to said discharge.

7. The process of treating products for the purpose of destroying insect life therein, which consists in creating an electrical discharge across a gap, interposing electrical condensers in series with said gap on both sides thereof to distribute the potential drop and limit the current density below the voltage gradients of the material to be treated, and subjecting the products to be treated to said discharge.

8. The process of treating articles for the purpose of destroying insect life which may be present therein, which consists in placing the said articles in series with the secondary coil of a transformer, discharging a disruptive conductive current across said articles and controlling the voltage gradient and current density of the said current across said articles to limit them to values below the rupturing gradient and carbonizing points, respectively, of said articles.

9. The process of treating articles for the purpose of destroying insect life which may be present therein, which consists in placing the said articles in series with a source of high tension current, discharging a disruptive conductive current across said articles, and controlling the voltage gradient and current density of the said current across said articles to limit them to values below the rupturing gradient and carbonizing points, respectively, of said articles.

10. The process of treating articles for the purpose of destroying insect life which may be present therein, which consists in placing the said articles in a circuit in series with a source of high tension current, discharging a disruptive conductive current across said articles, and interposing means in said circuit for controlling the voltage gradient and current density of the said current across said articles to limit them to values below the rupturing gradient and carbonizing points, respectively, of said articles.

11. The process of treating articles for the purpose of destroying insect life which may be present therein, which consists in placing the said articles in series with the secondary coil of a transformer, discharging a disruptive conductive current across said articles, and interposing means in the circuit for controlling the voltage gradient and current density of the said current across said articles to limit them to values below the rupturing gradient and carbonizing points, respectively, of said articles.

12. The process of treating articles for the purpose of destroying insect life which may be present therein, which consists in placing the said articles in series with a source of high tension electric current, discharging a disruptive conductive current across said articles, and interposing means in the circuit for controlling the voltage gradient and current density of said current across said articles to limit them to values below the rupturing gradient and carbonizing points, respectively, of said articles.

13. The process of treating articles for the purpose of destroying insect life which may be present therein, which consists in placing in series in an electric circuit, electrical capacity and a gap, discharging a plurality of disruptive conductive currents between different points across the said gap, thereby creating a field of disruptive conductive current in said gap and subjecting the articles to the said discharges.

14. The process of treating objects for the purpose of destroying insect life, which consists in creating a plurality of electrical discharges between different points across a gap, thereby forming a field of such discharges, interposing electrical capacity in series with said gap, and subjecting the objects to be treated to the discharges in said field.

15. The process of treating products for the purpose of destroying insect life which may be present therein, which consists in creating a plurality of independent electrical discharges between different points across a gap, interposing means in series with said gap to distribute the potential drop and limit the current density of said discharges below the voltage gradient of the material to be treated, and subjecting the products to the said discharges.

16. The process of treating products for the purpose of destroying insect life which may be present therein which consists in the creation of a plurality of disruptive conductive currents between a plurality of different points across a gap, thereby forming a field of disruptive conductive discharges, and interposing electrical capacity in an electric circuit in series with the said gap and subjecting the products to the action of the said discharges.

17. The process of treating articles and objects for the purpose of destroying insect life which may be present therein, which comprises the creation of a plurality of independent disruptive conductive discharges between different points across a gap, thereby forming a field of such discharges, interposing means in series with said gap for controlling the voltage gradient and current density of the said discharges, and subjecting the objects or articles to be treated to the said discharges.

18. The process of treating products electrically, which consists in placing a plurality of gaps in series in a circuit, overstressing one of said gaps and thereby causing the discharge of a disruptive conductive current across said overstressed gap and subjecting the products to said current.

In testimony that I claim the foregoing as my invention, I have hereunto signed my name this 27th day of April, A. D. 1918.

FRANKLIN S. SMITH.